US006834245B2

(12) United States Patent
Ota et al.

(10) Patent No.: US 6,834,245 B2
(45) Date of Patent: Dec. 21, 2004

(54) METHOD AND APPARATUS FOR MONITORING THE STATUS OF MANUFACTURING PRODUCTS

(75) Inventors: Masahi Ota, Kariya (JP); Tohru Irie, Nagoya (JP)

(73) Assignee: Sango Co., Ltd., Nagoya (JP)

( * ) Notice: Subject to any disclaimer, the term of this patent is extended or adjusted under 35 U.S.C. 154(b) by 0 days.

(21) Appl. No.: 09/816,091

(22) Filed: Mar. 26, 2001

(65) Prior Publication Data

US 2001/0025225 A1 Sep. 27, 2001

(30) Foreign Application Priority Data

Mar. 27, 2000 (JP) ....................................... 2000-087185

(51) Int. Cl.$^7$ .............................................. G06F 19/00
(52) U.S. Cl. .............................. 702/84; 705/26; 705/51
(58) Field of Search .............................. 702/84; 705/26, 705/51, 52, 54, 59, 403; 355/25

(56) References Cited

U.S. PATENT DOCUMENTS

| 4,787,050 A | * | 11/1988 | Suzuki ....................... 700/232 |
| 5,418,713 A | * | 5/1995 | Allen ........................... 705/32 |
| 5,682,227 A | * | 10/1997 | Taguchi et al. ............... 355/25 |
| 5,734,719 A | * | 3/1998 | Tsevdos et al. ............. 700/234 |
| 5,925,127 A | * | 7/1999 | Ahmad ....................... 713/200 |
| 6,018,972 A | | 2/2000 | Irie |
| 6,067,833 A | | 5/2000 | Irie |

FOREIGN PATENT DOCUMENTS

| EP | 1 053 799 A2 | 11/2000 |
| JP | A 6-96381 | 4/1994 |
| JP | A 6-119164 | 4/1994 |
| JP | A 8-215992 | 8/1996 |
| JP | B2 2737415 | 1/1998 |
| JP | B2 2957153 | 7/1999 |
| JP | B2 2957154 | 7/1999 |
| JP | A 11-237093 | 8/1999 |

\* cited by examiner

*Primary Examiner*—John Barlow
*Assistant Examiner*—Stephen Cherry
(74) *Attorney, Agent, or Firm*—Oliff & Berridge, PLC (57) ABSTRACT

The present invention is directed to a method and apparatus for monitoring the status of manufacturing products continuously according to one of a plurality of manufacturing processes. It is determined whether at least a predetermined manufacturing program out of a plurality of manufacturing programs corresponding to the plurality of manufacturing processes has been executed. The number of operations executed for manufacturing products according to the predetermined manufacturing program is stored, when it is determined that the predetermined manufacturing program has been executed. And, the stored number of operations executed for manufacturing the products according to the predetermined manufacturing program is output. Accordingly, when a license agreement is provided for a property covering the products or the process for manufacturing the products, it can be determined if the products or the process made or used by a licensee is covered by the licensed property, on the basis of operation of the predetermined manufacturing program. It may be so constituted that the predetermined manufacturing program is stored through a communication device, and that the status of manufacturing products is transmitted through the communication device.

12 Claims, 4 Drawing Sheets

METHOD AND APPARATUS FOR MONITORING THE STATUS OF MANUFACTURING PRODUCTS

This application claims priority under 35 U.S.C. Sec. 119 to No. 2000-87185 filed in Japan on Mar. 27, 2000, the entire content of which is herein incorporated by reference.

BACKGROUND OF THE INVENTION

1. Field of the Invention

The present invention relates to a method and an apparatus for monitoring the status of manufacturing products, more particularly to the method and apparatus for monitoring the status of manufacturing products continuously according to one of a plurality of manufacturing processes.

2. Description of the Related Arts

In the case where a licensing with a royalty is contemplated with respect to a patented invention or know how on a method or an apparatus for manufacturing products continuously, the royalty may be calculated on the basis of the number of products manufactured according to the method or apparatus. In this case, it is necessary to obtain the number of operations of the manufacturing process, or the number of products manufactured by the manufacturing process, accurately.

In Japanese Patent Laid-open Publication No. 8-215992, Japanese Patent No. 2737415 and so on, there is disclosed a technology for monitoring and checking the operating status of working machines, remotely. And, in Japanese Patent Laid-open Publication No. 6-96381, Japanese Patent Laid-open Publication No. 11-237093 and so on, there is disclosed a technology for monitoring the consumption of energy used by production lines, remotely, and calculating the amount of fees charged to each division. Furthermore, in accordance with the progress of the technology of information and communication, It is proposed that a computer software is distributed to a work station of a third party through a communication infrastructure such as the Internet, and that the status of using the software is monitored remotely, to count the used amount, and even to charge fees according to the used amount, as disclosed in Japanese Patent Laid-open Publication No. 6-119164, for example.

According to the method and apparatus as described in any of the above-described publications, however, it was impossible to obtain the number of operations of the manufacturing process, or the number of products manufactured by the manufacturing process, accurately. Therefore, not only the periodical accounting of the royalty on the basis of the number of operations of the manufacturing process, or the number of products manufactured by the manufacturing process, reporting and confirming the same were troublesome, but also it was very difficult to obtain the accounting result which would satisfy both parties, i.e., a licensor and a licensee. Especially, in the case where the object to be licensed is the patented invention or know how of the manufacturing process, and where a well known manufacturing process and the licensed manufacturing process can be practiced by a commonly used manufacturing apparatus, and these processes are executed alternately, it will be very difficult to determine which manufacturing process was executed, or which manufacturing process was executed to provide the finished products.

SUMMARY OF THE INVENTION

Accordingly, it is an object of the present invention to provide a method for monitoring the status of manufacturing products continuously according to a predetermined manufacturing process out of a plurality of manufacturing processes, certainly and easily.

It is another object of the present invention to provide an apparatus for monitoring the status of manufacturing products continuously according to the predetermined manufacturing process, certainly and easily.

In accomplishing the above and other objects, the method for monitoring the status of manufacturing products continuously according to one of a plurality of manufacturing processes, comprises determining if at least a predetermined manufacturing program out of a plurality of manufacturing programs corresponding to the plurality of manufacturing processes has been executed, storing the number of operations executed for manufacturing products according to the predetermined manufacturing program, when it is determined that the predetermined manufacturing program has been executed, and outputting the stored number of operations executed for manufacturing the products according to the predetermined manufacturing program.

The apparatus for monitoring the status of manufacturing products continuously according to one of a plurality of processes may comprise a determination device for determining if at least a predetermined manufacturing program out of a plurality of manufacturing programs corresponding to the plurality of manufacturing processes has been executed, a storage device for storing the number of operations executed for manufacturing the products according to the predetermined manufacturing program, when the determination device determines that the predetermined manufacturing program has been executed, and an output device for outputting the number of operations executed for manufacturing the products according to the predetermined manufacturing program stored in the storage device.

For example, in the case where a license agreement was made with respect to a predetermined manufacturing process for manufacturing products continuously, and where a manufacturing apparatus was sold by a licensor to a licensee under such conditions that the licensee would pay to the licensor a royalty calculated on the basis of the number of products manufactured by the licensee according to the predetermined manufacturing process, if the manufacturing apparatus sold by the licenser could perform a plurality of manufacturing processes, including not only the licensed process but also a well known prior manufacturing process, it would become necessary to identify the products which were manufactured by the licensed process. In that case, the manufacturing apparatus may be constituted so as to manufacture the products according to a predetermined manufacturing program corresponding to a predetermined manufacturing process out of a plurality of manufacturing programs corresponding to a plurality of manufacturing processes, and the method for monitoring the status of manufacturing products may be practiced, or the apparatus for monitoring the status of manufacturing products may be connected to the manufacturing apparatus, or may be formed therewith in a body. Then, it can be determined that at least the predetermined manufacturing program out of the plurality of manufacturing programs corresponding to the plurality of manufacturing processes has been executed, and the number of operations executed for manufacturing products according to the predetermined manufacturing program can be stored, when it is determined that the predetermined manufacturing program has been executed, so that the stored number of operations executed for manufacturing the products according to the predetermined manufacturing program can be output.

In the method and apparatus for monitoring the status of manufacturing products, a program may be provided for determining if the predetermined manufacturing program has been executed, together with the plurality of manufacturing programs, or independently therefrom. In addition, a detection device may be provided for detecting operation of a certain driving device operated according to the predetermined manufacturing program, to output a predetermined signal, on the basis of which it is determined if the predetermined manufacturing program has been executed. Furthermore, it may be so constituted that the number of operations executed for manufacturing the products according to the predetermined manufacturing program is stored, when it is determined that the predetermined manufacturing program has been executed according to the determining program, and determined that the predetermined manufacturing program has been executed on the basis of the output signal of the detection device. The stored number of operations may be transmitted to a communication infrastructure.

On the basis of the result monitored by the method and apparatus for monitoring the status of manufacturing products, various embodiments can be constituted. For example, it may be so constituted that if the number of operations is not output under a predetermined limited condition, the manufacturing apparatus is prohibited from being operated. It may be so constituted that the predetermined manufacturing program is stored through a communication device, and that the status of manufacturing products is transmitted through the communication device. Furthermore, it may be so constituted that a fictitious manager is placed on the communication infrastructure, and the status of operation of the manufacturing apparatus and/or the stored information of operation are transmitted to the manager, and that the licensor contacts the manager to check the status.

BRIEF DESCRIPTION OF THE DRAWINGS

The above stated object and following description will become readily apparent with reference to the accompanying drawings, wherein like reference numerals denote like elements, and in which.

DESCRIPTION OF THE PREFERRED EMBODIMENTS

Figure 1:
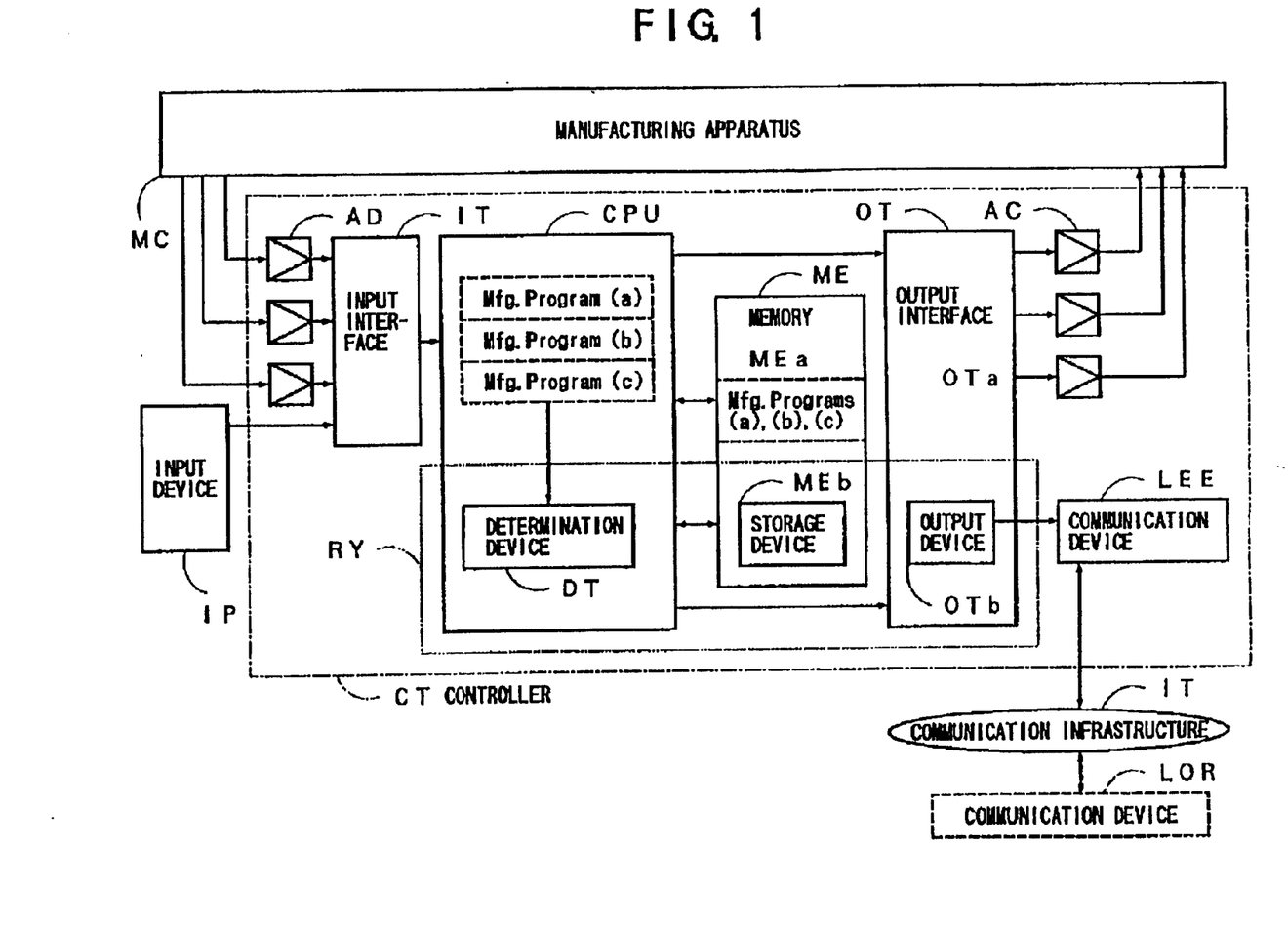
FIG. 1 is a schematic block diagram illustrating a manufacturing system including an apparatus for monitoring the status of manufacturing products according to an embodiment of the present invention.

Referring to FIG. 1, there is schematically illustrated a manufacturing system, which is capable of performing a spinning process, and which includes an apparatus for monitoring the status of manufacturing the products according to an embodiment of the present invention. As for a manufacturing apparatus MC for manufacturing products continuously according to a predetermined manufacturing process out of a plurality of manufacturing processes, explained hereinafter is such an apparatus that is capable of performing an offset spinning process as disclosed in Japanese Patent No. 2957153 and the U.S. Pat. No. 6,018,972, an oblique spinning process as disclosed in Japanese Patent No. 2957154 and the U.S. Pat. No. 6,067,833, and a conventional coaxial spinning process. The apparatus for monitoring the status of manufacturing the products according to the present embodiment corresponds to a monitoring device as enclosed by a two-dotted chain line in FIG. 1, and formed with a controller CT of a spinning apparatus in a body, while it may be formed separately.

Each driving device (not shown) installed in the manufacturing apparatus MC (spinning apparatus) is electrically connected to the controller CT as shown in FIG. 1, by which control signals are fed to each driving device to control it numerically. The controller CT includes a central processing unit CPU, memory ME, input interface IT and output interface OT, which are connected with each other through a bass bar, as shown in FIG. 1. The controller CT which serves as a control device may be embodied separately from the manufacturing apparatus MC, or may be embodied in a body therewith. Or, besides of the controller CT and manufacturing apparatus MC, a device having a software for controlling them may be provided independently from them. The processing unit CPU is adapted to execute a program for spinning process according to the present embodiment and monitoring the status of working on products. The memory ME includes a section (MEa) which stores, or memorizes a plurality of manufacturing (working) programs, and which temporarily memorizes variable data needed to execute the programs, and includes a section (MEb) which stores the number of operations executed for manufacturing the products according to a predetermined manufacturing (working) program, and which serves as the storage device.

An input device IP is connected to the input interface IT to input initial conditions, operating conditions or the like of each driving device into the processing unit CPU, e.g., by operating a key board or the like manually. In addition, various sensors (not shown) are provided, if necessary, and signals detected by those sensors are fed to the controller CT, wherein the signals are input from the input interface IT to the processing unit CPU through amplifying circuits AD. In the output interface OT, there are provided a section (OTa) which outputs control signals to each driving device through driving circuits AC, and a section (OTb) for use in a monitoring device RY.

In the section for storing programs (MEb) of the memory ME, there are stored a plurality of manufacturing (working)

programs (a, b, c and so on) corresponding to a plurality of processes performed in the processing unit CPU (the offset spinning process, oblique spinning process, and coaxial spinning process, according to the present embodiment), among which a predetermined manufacturing (working) program is selected by the processing unit CPU to be executed. As a result, the products will be manufactured in such a manner as described in a published European Patent application No. EP1053799A2. Those manufacturing (working) programs may be stored in the memory ME of the controller CT as they are. Or, a support software may be stored in the memory ME, so that the manufacturing (working) program is produced by the support software automatically, when the dimensions or the like of the products to be made are input through the input device IP. The plurality of manufacturing (working) programs (a, b, c and so on) may be formed into a single program, to be distinguished by flags or the like.

As indicated by the two dotted chain line in FIG. 1, monitoring device RY includes a determination device DT constituted in the processing unit CPU, a storage device MEb, constituted in the memory ME, and an output device OTb constituted in the output interface OT. The determination device DT has a program for determining if the predetermined manufacturing program has been executed, together with the plurality of manufacturing programs, or independently therefrom, and determines if the predetermined manufacturing program (e.g., the program for the offset spinning process) has been executed among the plurality of manufacturing programs (a, b, c) corresponding to the plurality of manufacturing processes (the offset spinning process, oblique spinning process and coaxial spinning process). For example, provided in advance is a flag for the process directly corresponding to, or specific to the offset spinning process or oblique spinning process, and if the flag is read in the program, then it can be determined that the program for the spinning process has been executed, so that the spinning process has been performed. The determination device DT may be constituted by a program coupled with the manufacturing programs (a, b, c), or may be constituted by another computer (not shown) and the program provided separately.

When it is determined by the determination device DT that the predetermined manufacturing program has been executed, the determined result is fed to the memory ME, where the number of operations executed for manufacturing the product according to the predetermined manufacturing program (e.g., the program for the offset spinning process) is stored in the storage device MEb, together with the time information. On the basis of the number of operations, therefore, the number of products manufactured according to the predetermined manufacturing program are specified. The information stored in the storage device MEb is transmitted to the output device OTb in the output interface OT at a real time, or at a specific timing. In the output device OTb, it is constituted that the information stored in the storage device MEb is output timely. The output may be set to be in a variety of forms, such as displaying the forms of numerical chart or graph showing monthly total number of operations, and date and time for each operation, continuously in the working time, or regularly or irregularly at a predetermined timing. The output forms, displaying forms, timing or the like are not limited to those as described above.

Figure 2:
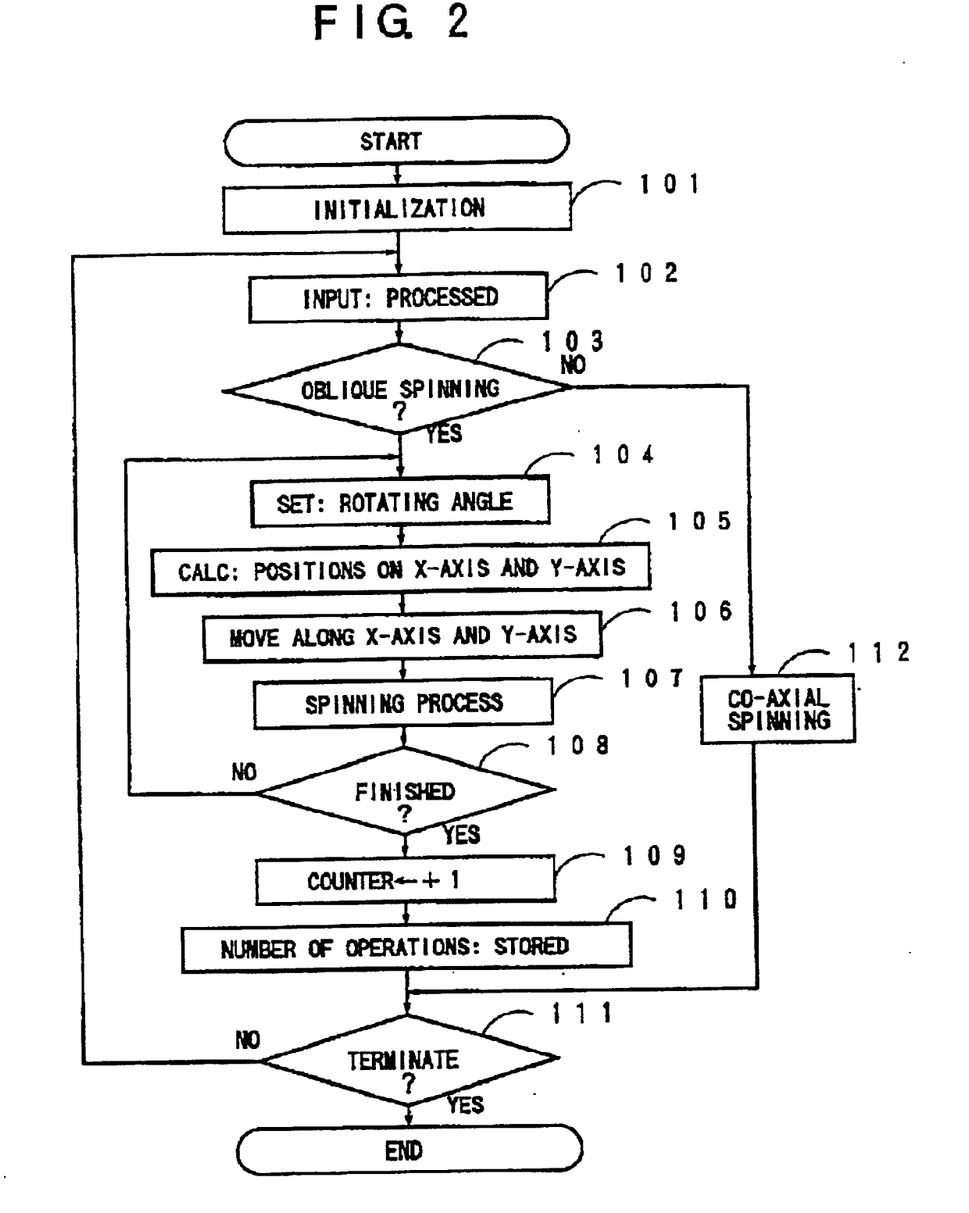
FIG. 2 is a flowchart showing an oblique spinning operation or coaxial spinning operation according to an embodiment of the present invention.
Figure 6:
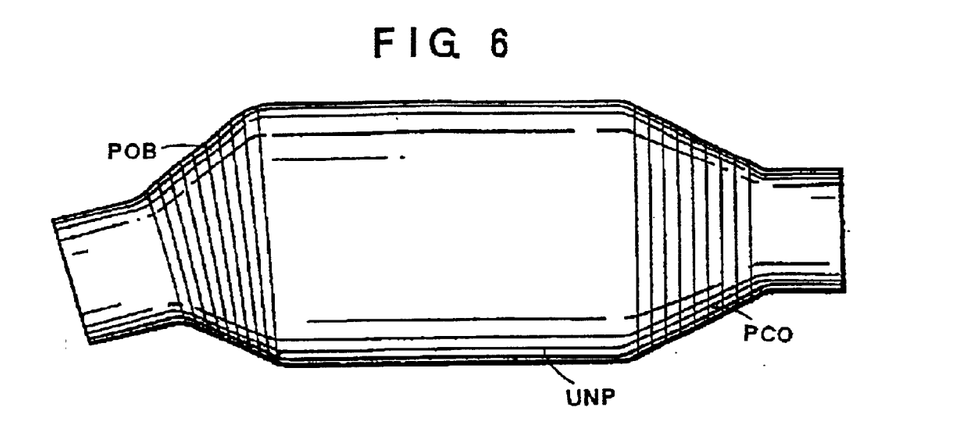
FIG. 6 is a front view of an example of a cylindrical member, one end portion at the left side of which is reduced in diameter about an oblique axis, and the other one end portion at the right side of which is reduced in diameter about an axis co-axial with a central axis of an unprocessed portion, by a spinning apparatus according to an embodiment of the present invention.
Figure 7:
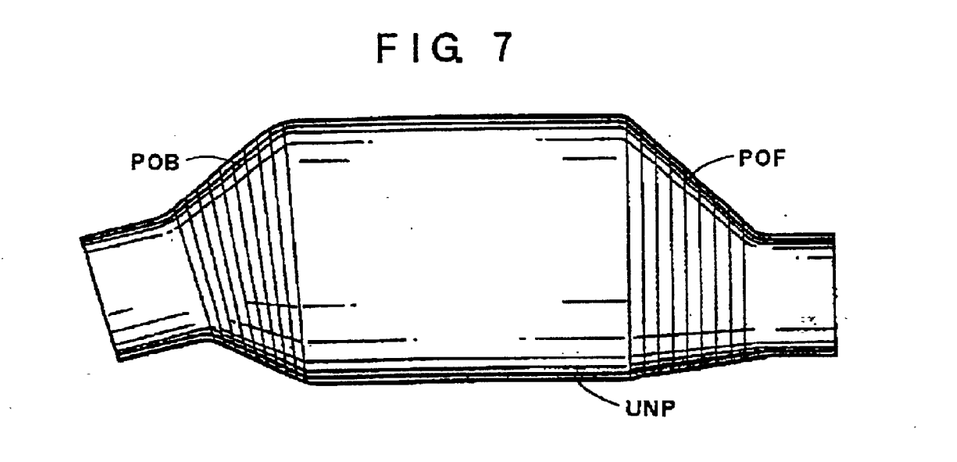
FIG. 7 is a front view of another example of a cylindrical member, one end portion at the left side of which is reduced in diameter about an oblique axis, and the other one end portion at the right side of which is reduced in diameter about an offset axis, by a spinning apparatus according to an embodiment of the present invention.
Figure 8:
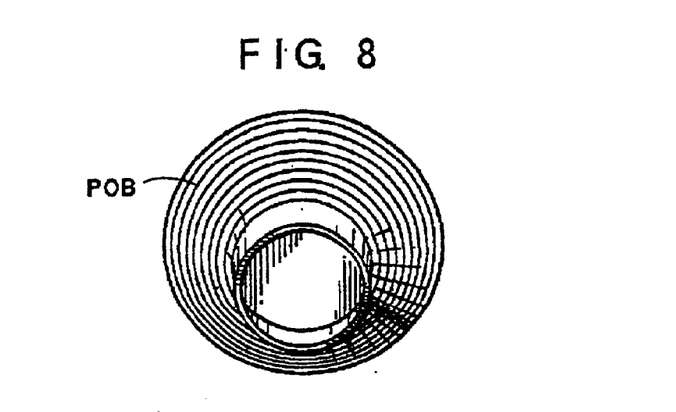
FIG. 8 is a side view of a cylindrical member, one end portion of which is reduced in diameter about an oblique axis, by a spinning apparatus according to an embodiment of the present invention.

Next will be explained the operation of the oblique spinning apparatus as disclosed in U.S. Pat. No. 6,067,833, the content of which is incorporated herein by reference. The oblique spinning apparatus, which serves as the manufacturing apparatus MC, is adapted to apply the oblique spinning process or the co-axial spinning process to the end portion of a cylindrical member (not shown), with reference to the flowchart as shown in FIG. 2. As a result, is formed the cylindrical member as shown in FIGS. 6 and 8, one end portion POB at the left side of which is reduced in diameter about an oblique axis to a central axis of an unprocessed portion UNP, and the other one end portion PCO at the right side of which is reduced in diameter about an axis co-axial with the central axis of the unprocessed portion UNP. Furthermore, if the offset spinning process as disclosed in U.S. Pat. No. 6,018,972, the content of which is incorporated herein by reference, the offset spinning process may be performed by the manufacturing apparatus MC, with the operation necessary for it added to the above-described spinning process. Then, is formed the cylindrical member as shown in FIG. 7, one end portion POB at the left side of which is reduced in diameter about the oblique axis to the central axis of the unprocessed portion UNP, and the other one end portion POF at the right side of which is reduced in diameter about the offset axis to the central axis of the unprocessed portion UNP.

Referring to FIG. 2, at the outset, initialization is made at Step 101 to clear a counter. Then, the signals input to the processing unit CPU by the input device IP or the like through the input interface IT are processed at Step 102. Next, at Step 103, it is determined by the determination device DT whether the program for the oblique spinning process is to be performed, or not. If the program for the oblique spinning process is to be performed, the flowchart as shown in FIG. 2 proceeds to Steps 104–110, otherwise it proceeds to Step 112, where the conventional co-axial spinning process is performed. At Step 104, a rotating angle of a clamp device (not shown) is set, and the clamp device is rotated so that its axis is oblique to a main axis (not shown). Next, its positions to be placed on the X-axis and Y-axis are calculated, at Step 105. Then, at Step 106, the clamp device is driven to move along the X-axis and Y-axis to the positions calculated at Step 105. Thus, after the clamp device was positioned, the spinning process is performed at Step 107. After the Steps 104–107 were repeated a predetermined number of times, if it is determined at Step 108 that the oblique spinning process has been finished, the counter for counting the number of operations of the oblique spinning process is incremented at Step 109. Then, the counted value, i.e., the number of operations is stored in the memory device MEb of the memory ME, at Step 110. If the counter is incremented at Step 109 in the next cycle, the number of operations stored in the storage device MEb is renewed at Step 110. Finally, the terminating conditions are determined at Step 111. If the terminating conditions have not been fulfilled, the flowchart in FIG. 2 returns to Step 102, and if terminating conditions have been fulfilled, the flowchart in FIG. 2 ends.

According to the present embodiment, there is provided a transmitting device LEE for transmitting the output of the output device OTb to a communication infrastructure IT (telephone line, Internet, private line, satellite communication, or the like). It is so constituted that a licensee holds the transmitting device LEE, through which the information of operation including the number of operations stored in the storage device MEb is transmitted to the communication infrastructure IT. The transmitting device LEE is included in the controller CT according to the present embodiment, while it may be installed separately. Therefore, if the transmitting device LEE is connected to the communication infrastructure IT, the output of the output device OTb can be transmitted not only to a firm of licensee, but also to a licensor. Consequently, the information including the number of operations stored in the storage device MEb is transmitted from the transmitting device LEE to the communication infrastructure IT at a real time, at a specific timing, or in response to a request of the licensor, so that the licensor can obtain the information about the operation through a communication device LOR. On the basis of the information about the operation, therefore, the royalty can be calculated, and invoiced to the licensee timely, for example.

It can be constituted that when the number of operations stored in the storage device MEb is not output from the output device OTb under a predetermined limited condition, the manufacturing apparatus MC is prohibited from being operated by the controller CT. As for the predetermined limited condition, it can be set by the licensor such that the number of operations stored in the storage device MEb is not transmitted, until it reaches a predetermined number of operations, for example. Or, it can be so constituted that the manufacturing apparatus MC is prohibited from being operated, when it has been found that unfair conducts, such that the manufacturing program was analyzed incorrectly. Instead, without prohibiting the operation of the manufacturing apparatus MC completely, it may be so constituted that only the licensed manufacturing program is prohibited, or that only a motion directly corresponding to the manufacturing program (i.e., the motion to be offset, or rotating motion of the clamp device) is prohibited.

Furthermore, it can be so constituted that the calculation and/or communication transmission are made in accordance with the predetermined licensing conditions. For example, on a ROM disk which is detachably installed in the manufacturing apparatus MC, the information including the ID number of the licensee and licensed number of operations, licensed term, or the like is written directly by the licensor, or through the communication infrastructure IT. When the manufacturing apparatus MC is operated, with the ROM disk inserted into it by the licensee, it is required to operate it under the predetermined conditions. Supposing that it was required as a condition to report the status of operation by transmitting it within a predetermined time period, if the condition was broken, then it would be placed in such a state that the manufacturing apparatus MC is forced to be physically unable to be operated. More practically may be written on the program such a limitation that unless the information about the operation is transmitted to the licensor by a predetermined due date, e.g., the information about the operation in the previous month is transmitted by 10th of the next month, or unless the information about the operation is transmitted to the licensor by the time when a certain number of operations are performed, the manufacturing apparatus MC shall be prohibited from being operated. The ROM disk is an example, and not limited to it, so that various kinds of memory device may be used, and may be constituted in a body with the manufacturing apparatus MC, or detachable therefrom.

As shown in FIG. 1, it may be so constituted that after the licensing agreement was made, the predetermined manufacturing program is transmitted to a communication device LEE by the licensor through the communication infrastructure IT and a communication device LOR, and then stored in the controller CT. Thereafter, the status of operation of the manufacturing apparatus MC is monitored as described before. And, it may be so constituted that if the incorrect analysis or modification of the manufacturing program is noticed, the fact will be transmitted to the licensor through the communication device LEE, communication infrastructure IT and communication device LOR, and the manufacturing program will be terminated or disappeared. Thus, the software such as the manufacturing program can be stored in a black box.

Figure 3:
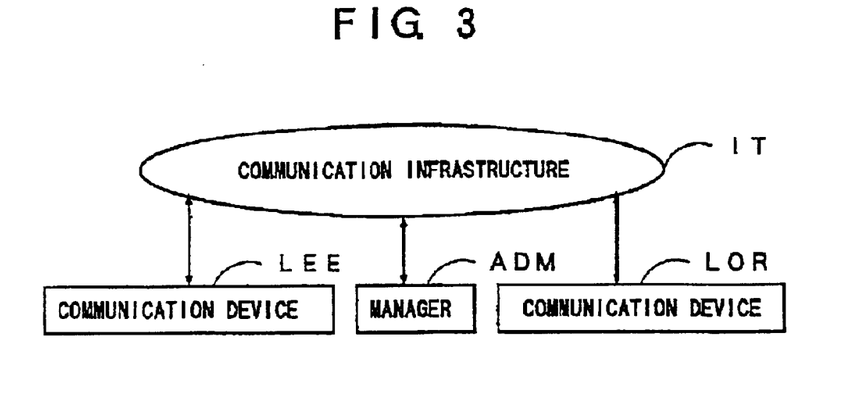
FIG. 3 is a block diagram of a system including a communication device according to an embodiment of the present invention.

Furthermore, as shown in FIG. 3, it may be so constituted that a fictitious manager ADM is placed on the communication infrastructure IT, and the status of operation of the manufacturing apparatus MC and/or the information about the operation stored in the storage device MEb or the like are transmitted to the manager ADM through the communication devices LEE and LOR, and that the licensor contacts the manager ADM to check the status of operation at an appropriate time.

Figure 4:
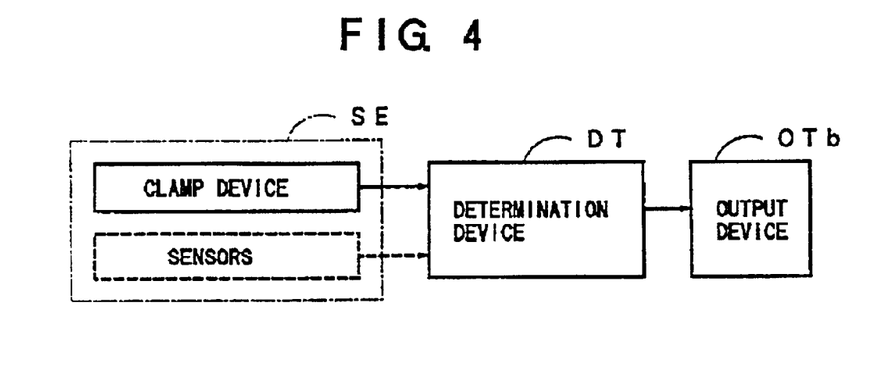
FIG. 4 is a block diagram of a determination device according to another embodiment of the present invention.

FIG. 4 discloses another embodiment which is provided with a detection device SE for detecting a predetermined driving device (not shown) in the manufacturing apparatus MC, and outputting a predetermined signal in response to the operation of the driving device, and in which the determination device DT is adapted to determine if the predetermined manufacturing program has been executed, on the basis of the output signal of the detection device SE. That is, in contrast to the aforementioned determination device DT which has the program for determining if the predetermined manufacturing program has been executed, together with the plurality of manufacturing programs, or independently therefrom, and which determines on the basis of the determining program if the predetermined manufacturing program has been executed, according to the present embodiment It is determined whether the predetermined manufacturing program has been executed, on the basis of the output signal of the detection device SE.

In the case where the offset spinning process as disclosed in Japanese Patent No. 2957153 and the U.S. Pat. No. 6,018,972 is performed, the offset axis (not shown) is set, with the clamp device (not shown) driven to move along the Y-axis, so that it can be determined that the offset spinning process has been performed, when it is detected by the detection device SE that the clamp device was driven to move along the Y-axis. Likewise, in the case where the oblique spinning process as disclosed in Japanese Patent No. 2957154 and the U.S. Pat. No. 6,067,833 is performed, the oblique axis (not shown) is set, with the clamp device (not shown) rotated, so that it can be determined that the oblique spinning process has been performed, when it is detected by the detection device SE that the clamp device was rotated. On the contrary, if the clamp device is not rotated, nor moves along the Y-axis, it can be determined that the conventional co-axial spinning process has been performed. Accordingly, if it is so constituted that the operation of the clamp device is detected directly by the detection device SE, or detected by various sensors, It can be determined that the predetermined manufacturing program has been executed.

Figure 5:
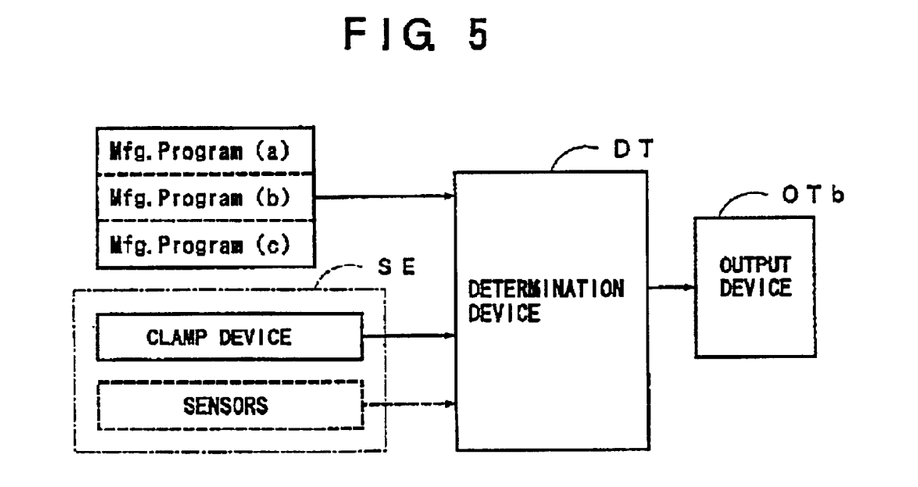
FIG. 5 is a block diagram of a determination device according to a further embodiment of the present invention.

FIG. 5 discloses a further embodiment which uses the determination based upon the output signal of the detection device SE, and the determination based upon the manufacturing program, by which a redundancy system is provided, thereby to determine if the predetermined manufacturing program has been executed more reliably. That is the determination device DT has the program for determining if the predetermined manufacturing (working) program has been executed, together with a plurality of manufacturing programs, or independently therefrom, and the storage device MEb stores the number of operations by which the products were manufactured according to the predetermined manufacturing program, if it is determined that the predetermined manufacturing program has been executed, according to the determining program, and on the basis of the output signal of the detection device SE, simultaneously.

As described above, it can be constituted that the controller CT for controlling the operation of the manufacturing apparatus MC (spinning apparatus) according to the plurality of manufacturing programs, is adapted to perform various processes on the basis of the monitored result of the monitor device RY which serves as the monitor device for monitoring the status of manufacturing the products. In addition, it can be so constituted that the licensor distributes the licensed manufacturing program at each time when the manufacturing apparatus starts to operate, and keeps the program apart from the apparatus when it does not operate. Or, it may be so constituted that the number of operations is not to be counted for the royalty base until it reaches a predetermined number of operations, or within a predetermined time from starting the operation, so as to ignore the number of operations performed for a trial operation of the apparatus by the licensee, or the operation performed during a trail period under an option contract.

Furthermore, supposing that the licensee has invented a manufacturing process which relates to the licensed manufacturing process for example, it can be determined by the apparatus as described before if the invention is fallen within the licensed scope. In practice, the information about the invention is input into the controller CT by the key board or the like, the invention is simulated by the apparatus, thereby to determine if the invention is fallen within the licensed scope. In addition to the determination device DT, therefore, a determination program may be provided separately, or may be provided to be integral with the determination device DT. With respect to the determination program, it may be so constituted that the scope is set to be a wider one with a predetermined room, within which it is determined if the invention is fallen. In case of the determination, the apparatus may be set to a lock-mode, not to be operated actually, so that the determination may be made by the software, which is stored in the apparatus, together with the result of the determination. The result may be transmitted to the licensee via the Internet, and if the determination program was unable to determine it, the result could be transmitted to the licensee for his determination.

Although the embodiments as described above relate to the spinning process, the present invention is not limited to that, but may be applied to many other methods and apparatuses. According to the embodiments as described above, the subject licensed under the license agreement is the patented method invention, but it may be an apparatus invention. Furthermore, it may be applied to a design patent, know how, copy right, technical assistance or the like. As for the copy right, the software for the manufacturing program, assisting program or the like may be licensed.

It should be apparent to one skilled in the art that the above-described embodiments are merely illustrative of but a few of the many possible specific embodiments of the present invention. Numerous and various other arrangements can be readily devised by those skilled in the art without departing from the spirit and scope of the invention as defined in the following claims.

What is claimed is:

1. A method for monitoring the status of manufacturing products continuously according to one of a plurality of manufacturing processes including a patented manufacturing process and a non-patented manufacture process, comprising:

manufacturing a product using the plurality of manufacturing processes, determining if at least the patented manufacturing process licensed by a license agreement, out of the plurality of manufacturing processes has been executed, storing the number of operations executed for manufacturing the product according to the patented manufacturing process, when it is determined that the predetermined manufacturing process has been executed; and outputting the stored number of operations executed for manufacturing the product according to the predetermined manufacturing process.

2. The method of claim 1, wherein the determining step comprises:

executing a program for determining if the patented manufacturing process has been executed, together with the plurality of manufacturing processes, or independently therefrom.

3. The method of claim 1, further comprising:

detecting operation of a device operated according to the patented manufacturing process; and outputting a predetermined signal, on the basis of which it is determined if the patented manufacturing process has been executed.

4. The method of claim 3, wherein the determining step comprises:

executing a program for determining if the patented manufacturing process has been executed, together with the plurality of manufacturing process, or independently therefrom, and wherein the storing step comprises:

storing the number of operations executed for manufacturing the product according to the patented manufacturing process, when is the program for determining has determined that the patented manufacturing process has been executed, and determined that the patented manufacturing process has been executed on the basis of the output signal.

5. The method of claim 1, further comprising:

transmitting the stored number of operations to a communication infrastructure.

6. An apparatus for monitoring the status of manufacturing products continuously according to one of a plurality of processes including a patented manufacturing process and a non-patented manufacturing process, comprising:

determination means for determining if at least the patented manufacturing process licensed by a license agreement, out of the plurality of manufacturing processes used for manufacturing a product, has been executed;

storage means for storing the number of operations executed for manufacturing the product according to the patented manufacturing process, when the determination means determines that the patented manufacturing process has been executed; and output means for outputting the number of operations executed for manufacturing the product according to the patented manufacturing process stored in the storage means.

7. The apparatus of claim 6, wherein the determination means comprises a program for determining if the patented manufacturing process has been executed, together with the plurality of manufacturing processes, or independently therefrom.

8. The apparatus of claim 6, further comprising:
  detection means for detecting operation of a device operated according to the patented manufacturing process, and outputting a predetermined signal,
  and wherein the determination means determines if the patented manufacturing process has been executed, on the basis of the signal output from the detection means.

9. The apparatus of claim 8, wherein the determination means, comprises:
  a program for determining if the patented manufacturing process has been executed, together with the plurality of manufacturing processes, or independently therefrom, and wherein the storage means stores the number of operations executed for manufacturing the product according to the patented manufacturing process, when the determination means determines that the patented manufacturing process has been executed according to the determining program, and determines that the patented manufacturing process has been executed on the basis of the signal output from the detection means.

10. The apparatus of claim 6, further comprising:
  communication means for transmitting the output of the output means to a communication infrastructure, to which the number of operations stored in the storage means is transmitted.

11. The apparatus of claim 6, wherein a license agreement is provided for a property covering the products or a process for manufacturing the products, under the license agreement, a licensee of the agreement holding the apparatus for monitoring the status of manufacturing the product, and wherein the monitoring apparatus determines if the product or the process made or used by the licensee is covered by the licensed property, on the basis of operation of the patented manufacturing process for manufacturing the products.

12. The apparatus of claim 11, wherein the property to be licensed under the license agreement is at least one of a utility patent, design patent, know how, copyright and technical assistance.

* * * * *